Patented Sept. 2, 1924.

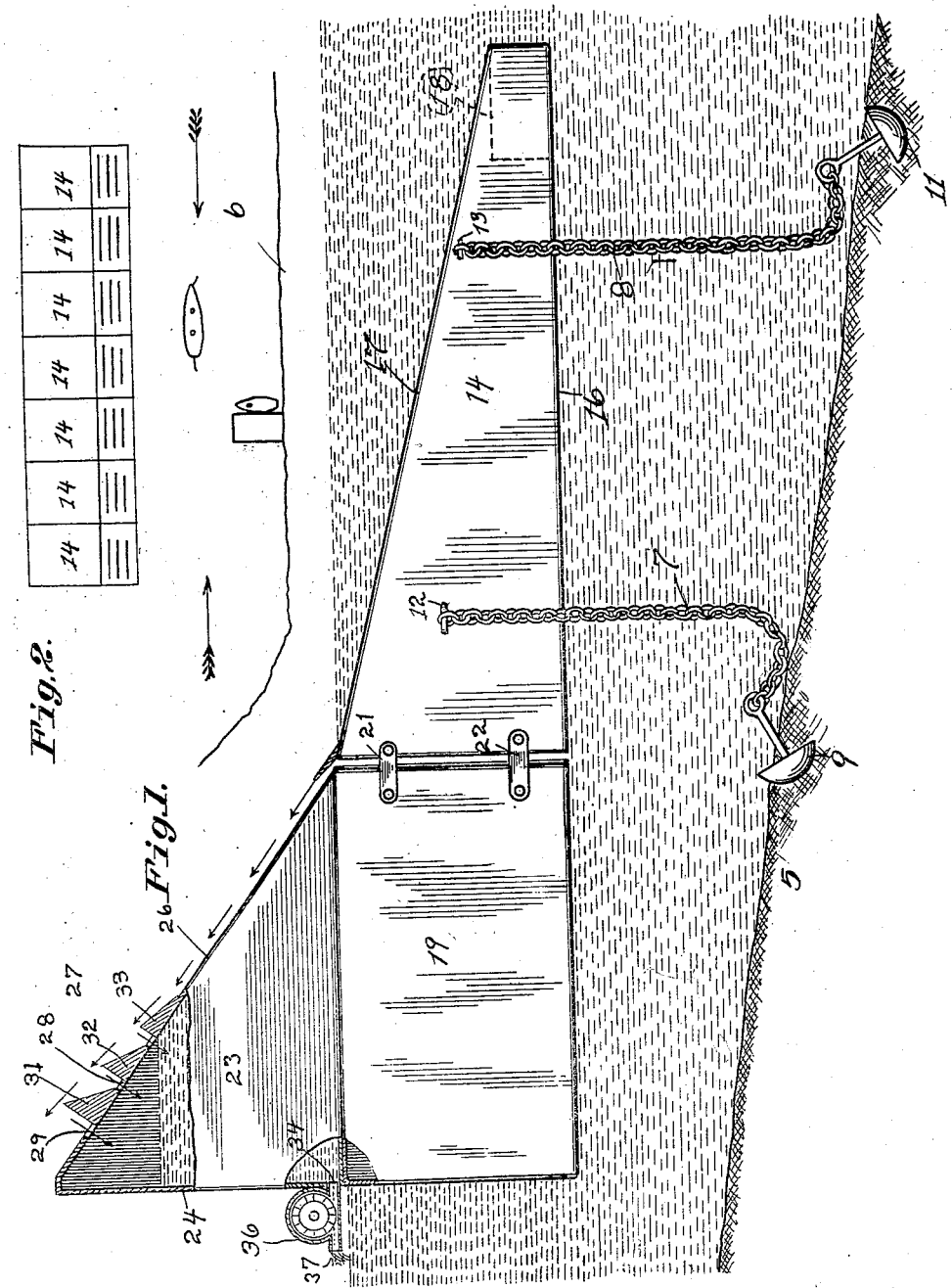

1,507,461

UNITED STATES PATENT OFFICE.

ROBERT P. CHASE, OF MONTARA, CALIFORNIA.

COMBINED FLOATING BREAKWATER AND POWER GENERATOR.

Application filed July 12, 1922. Serial No. 574,507.

*To all whom it may concern:*

Be it known that I, ROBERT P. CHASE, a citizen of the United States, residing at Montara, in the county of San Mateo and State of California, have invented new and useful Improvements in Combined Floating Breakwaters and Power Generators, of which the following is a specification.

This invention relates to improvements in combined floating break waters and power generators, the principal object of which is to provide means whereby the force of the waves adjacent the shore is broken up before reaching the shore, thereby preventing shoaling, and at the same time providing a safe anchorage for vessels and the like.

Another object is to provide means for storing up and generating power derived from the action of the waves.

A further object is to provide a device of the above mentioned character which may be readily moved from point to point and one which is cheap to construct in comparison with the ordinary break water.

A still further object is to provide a break water which may be employed where the depth would make it impractical to build a break water reaching from the bottom to a point above the high water mark.

Other objects and advantages will be apparent during the course of the following description.

In the accompanying drawings forming a part of this specification, and in which like numerals are employed to designate like parts throughout the same, Figure 1 is a side elevation of my device showing the position it would take in the water, and Figure 2 is a diagrammatic view showing the position that several units would assume in the protection of a harbor or shore line.

Heretofore, as far as applicant is aware, break waters have been built at enormous expense, and in many places it would be entirely impossible to build a suitable break water due to the shape of the harbor or shore line, and also due to the depth at which the shore shelves off. I therefore propose to construct a break water which is composed of a series of tanks, which float at a suitable distance from the shore line, which tanks are so constructed to arrange that they will break up the force of the waves, and at the same time a portion of the water of the waves will be conserved in the tanks and later released through suitable valves to power generators such as turbines.

In the accompanying drawings wherein for the purpose of illustration is shown a preferred embodiment of my invention, the numeral 5 designates the bottom at a point some distance from the shore which is designated by the numeral 6 in Figure 2. The numerals 7 and 8 refer to chains secured to anchors 9 and 11 buried in the bottom 5. These chains extend upwardly and are secured through the medium of eyes 12 and 13, the side of the tank being designated as a whole by the numeral 14. This tank 14 has a flat bottom 16 and an inclined top 17. By this construction, the side elevation of the tank has the appearance of a wedge, the point of which projects in the direction of the oncoming waves. A suitable weight 18 is located in the side of the tank 14 so that the same assumes the position shown in Figure 1, that is, with the bottom of the tank 16 on the level.

At 19, I have shown a hollow tank which is secured as by links 21 and 22 to the tank 14. This tank 19 is substantially rectangular in shape and may be of any convenient size best suited for the use to which it is being placed. This tank 19 supports upon its upper surface a tank 23 having a vertical rear side 24 and an inclined top 26. This inclined top extends downwardly so as to join the inclined top 17 of the tank 14. This tank 23 is adapted to be filled with sea water through openings 27, 28 and 29, which openings have secured adjacent thereto scoops as indicated at 31, 32 and 33, while a suitable outlet 34 provides for the escape of the sea water from within the tank 23. This catching of the water at the same time prevents the usual undertow incident to the receding of a wave and further assists in breaking up the wave action.

It will thus be seen that I have provided a very simple means of breaking up the wave action at a point beyond the shore thereby providing a harbor of relatively quiet water, and at the same time I have prevented the destructive action of the waves upon the shore which causes rapid shoaling, which in some sections is very pronounced. It will also be seen that I have provided a structure which is exceedingly cheap in comparison to the usual break water, and one which may be transported from place to place, as occasion may require the changing of a loading or unloading harbor as for special work.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim :—

1. In a floating break water, a tank adapted to act as a float, a tapered tank secured to said first mentioned tank, a weight provided at the forward end of said tapered tank for the purpose of retaining the tapered portion of said tank at a point beneath the surface of the water, a third tank mounted on said first mentioned tank, and means for filling said third mentioned tank through the action of waves contacting therewith.

2. In a floating break water, a tank adapted to act as a float, a tapered tank secured to said first mentioned tank, a weight provided at the forward end of said tapered tank for the purpose of retaining the tapered portion of said tank at a point beneath the surface of the water, a third tank mounted on said first mentioned tank, means for filling said third mentioned tank through the action of waves contacting therewith, and means for deriving power from the water within said third mentioned tank.

3. In a floating break water, a tank adapted to act as a slope, a tapered tank secured to said first mentioned tank, the small end of said tapered tank extending away from said first mentioned tank, a weight secured to the forward end of said tapered tank for the purpose of retaining the same at a point between the surface of the water, a third tank mounted on said first mentioned tank, a plurality of longitudinally disposed scoops positioned on said third mentioned tank, said tank having openings formed therethrough at points adjacent said scoops, and means for deriving power from water stored within said third mentioned tank through the action of said scoops.

In testimony whereof I affix my signature.

ROBERT P. CHASE.